United States Patent [19]

Okugaki et al.

[11] Patent Number: 5,450,424
[45] Date of Patent: Sep. 12, 1995

[54] SEMICONDUCTOR MEMORY DEVICE WITH ERROR CHECKING AND CORRECTING FUNCTION

[75] Inventors: Akira Okugaki; Hiroyasu Makihara; Kenji Kohda, all of Hyogo, Japan

[73] Assignee: Mitsubishi Denki Kabushiki Kaisha, Tokyo, Japan

[21] Appl. No.: 65,301

[22] Filed: May 24, 1993

[30] Foreign Application Priority Data

Jul. 27, 1992 [JP] Japan ............................ 4-199480

[51] Int. Cl.⁶ .................................................. H03M 13/00
[52] U.S. Cl. ........................................... 371/40.1; 365/201
[58] Field of Search ................................... 365/103–105, 365/174–188, 189.1–189.12, 200; 371/10.1–10.3, 21.1, 40.1; 395/400

[56] References Cited

U.S. PATENT DOCUMENTS

| | | | |
|---|---|---|---|
| 4,523,313 | 6/1985 | Nibby, Jr. et al. | 371/10.1 |
| 4,527,251 | 7/1985 | Nibby, Jr. et al. | 395/400 |
| 4,918,692 | 4/1990 | Hidaka et al. | 371/40.1 |
| 5,008,857 | 4/1991 | Mizoguchi | 365/200 |
| 5,124,948 | 6/1992 | Takizawa et al. | 371/10.1 |
| 5,142,540 | 8/1992 | Glasser | 371/40.1 |
| 5,164,944 | 11/1992 | Benton et al. | 371/40.1 |
| 5,227,997 | 7/1993 | Kikuda et al. | 365/189.08 |
| 5,313,464 | 5/1994 | Reiff | 371/40.1 |
| 5,379,258 | 1/1995 | Murakami et al. | 371/10.1 |

OTHER PUBLICATIONS

Ryuji Shibata "1 Mbit Mask Rom and Its Application", Hitachi Review vol. 66 No. 7 (1984–7).

*Primary Examiner*—James P. Trammell
*Attorney, Agent, or Firm*—Lowe, Price, Leblanc & Becker

[57] ABSTRACT

A memory cell array is divided into a plurality of subregions along row and column directions. In data reading, 1-bit memory cell is selected from each of the subregions which are arranged on different rows and different columns in this memory cell array. Data are simultaneously read from the simultaneously selected memory cells. The simultaneously read data include information bits and at least one error checking bit. Only data of a 1-bit memory cell is read from one word line at the maximum. Thus, it is possible to extremely reduce a probability that two or more erroneous data bits are included in a plurality of bits of simultaneously read data even if a selected word line is defective. It is possible to execute error checking and correction in accordance with an ECC scheme, improving repairability for defective bits in a semiconductor memory device.

16 Claims, 14 Drawing Sheets

SEMICONDUCTOR MEMORY DEVICE WITH ERROR CHECKING AND CORRECTING FUNCTION

BACKGROUND OF THE INVENTION

1. Field of the Invention

The present invention relates to a semiconductor memory device, and more particularly, it relates to a semiconductor memory device having an ECC (Error Checking and Correction) function.

2. Description of the Background Art

An information processing system employs various types of memory devices for storing information. One of such memory devices is a semiconductor memory device, which is made of a semiconductor such as silicon.

FIG. 11 illustrates the structure of a memory cell array of a general semiconductor memory device. As shown in FIG. 11, the memory cell array of such a semiconductor memory device generally includes a plurality of memory cells MC which are arranged in a matrix of rows and columns. Word lines WL1 to WLn are provided in correspondence to respective rows of the memory cell array. Memory cells MC of one row are connected to each of the word lines WL1 to WLn. Bit lines (or bit line pairs) CL1 to CLm are provided in correspondence to respective columns of the memory cell array. Memory cells MC of one column are arranged on each of the bit lines (or bit line pairs) CL1 to CLm.

In selection of a 1-bit memory cell MC, one word line WLi (i=1 to n) and one bit line (or bit line pair) CLj (j=1 to m) are selected. A memory cell MC which is arranged in correspondence to the intersection of the selected word line WLi and the selected bit line (or bit line pair) CLj is selected, and data can be written in or read from the selected memory cell MC.

The structures of memory cells are varied with the types of semiconductor memory devices. The semiconductor devices include a random access memory (RAM) which can write and read information in a random sequence, a nonvolatile semiconductor memory device which can store information in a nonvolatile manner, and the like. An example of the nonvolatile semiconductor memory device is a mask ROM (read only memory) for storing fixed data.

FIGS. 12A and 12B illustrate the structure of a memory cell which is employed for a mask ROM. Referring to FIG. 12A, the memory cell comprises a MOS (insulated gate) transistor having a gate which is connected to a word line WL, a drain which is connected to a bit line CL and a source which is connected to the ground potential.

Referring to FIG. 12B, the memory cell includes impurity regions 502 and 504 which are formed on a surface of a semiconductor substrate 500 and a control gate 508 which is formed on a channel region 506 between the impurity regions 502 and 504 with a gate insulating film 509 underlaid. The control gate 508 is connected to the word line WL and the impurity region 502 provides a drain (or source) region which is connected to the bit line CL, and the impurity region 504 provides a source (or drain) region which is connected to the ground potential. In general, the impurity regions 502 and 504 are formed of N-type regions of high impurity concentration, and the semiconductor substrate 500 is prepared from a P-type semiconductor substrate.

In order to adjust the threshold voltage of the memory cell transistor, ions are implanted into the channel region 506. The threshold voltage of this memory cell transistor is shifted by such ion implantation into the channel region 506.

As shown in FIG. 13, a memory cell transistor has a depletion type threshold voltage (curve 516 in FIG. 13) or an enhancement type threshold voltage (curve 517 in FIG. 13) by ion implantation into the channel region 506. FIG. 13 illustrates the relation between the gate voltage of the memory cell transistor and a drain current flowing through this transistor. The axis of ordinates indicates the drain current Ids, and the axis of abscissas indicates the gate voltage Vgs.

The direction in which the threshold voltage of the memory cell transistor by ion implantation is shifted is determined by the species of implanted ions. FIG. 13 shows threshold voltages of a depletion type memory cell transistor and an enhancement type memory cell transistor as Vth2 and Vth1 respectively. In the depletion type memory cell transistor, the drain current Ids flows when its gate voltage Vgs exceeds the threshold voltage Vth2. In the enhancement type memory cell transistor, on the other hand, the drain current Ids flows when its gate voltage Vgs exceeds the threshold voltage Vth1.

It is assumed that a memory cell transistor having the depletion type threshold voltage stores a logic "1" data, while a memory cell transistor having the enhancement type threshold voltage stores a logic "0" data.

In the depletion type memory cell transistor corresponding to a state storing information "1", an inversion layer is formed in the channel region 506 to flow the drain current Ids even if the potential at the control gate 508 (word line WL) is 0 V. In the enhancement type memory cell transistor corresponding to a state storing information "0", no drain current Ids flows when a voltage of 0 V is applied to the control gate 508 (word line WL). The information is read according to presence/absence of the drain current Ids on the bit line CL in selection of the word line WL.

As an alternative to the aforementioned setting of the threshold voltage by ion implantation, information may be written in the mask ROM according to presence/absence of contact between the source of the memory cell transistor and the bit line or between the drain and the ground potential.

In a general semiconductor memory device, the rate of occurrence of defective bits is increased following increase in storage capacity. In order to repair such defective bits, a redundant row and/or a redundant column is so provided as to replace the defective bits by the redundant row or column, thereby repairing the defective bits in a redundancy structure. When the storage capacity is further increased, however, the number of the defective bits may be so increased that all the defective bits may not be repaired by such a redundancy structure. Therefore, the semiconductor memory device is provided with an ECC function for checking errors in stored information and correcting as-checked errors.

FIG. 14 schematically illustrates the overall structure of a general mask ROM which is provided with an ECC function. Referring to FIG. 14, the mask ROM includes a memory cell array 600 of the aforementioned memory cells which are arranged in a matrix of rows and columns. This memory cell array 600 includes an information bit region 602 for storing information bits and an error checking bit region 604 storing error checking bits for checking errors of the information bits.

The mask ROM further includes an X decoder 606 which decodes row address signal bits RA0 to RAn for selecting a corresponding row (word line) of the memory cell array 600, a Y decoder 608 which receives column address signal bits CA0 to CAm for generating signals for selecting corresponding columns (bit lines) of the memory cell array 600, a Y gate circuit 610 for connecting selected columns of the memory cell array 600 to internal data lines (not shown) in response to outputs from the Y decoder 608, and a sense amplifier circuit 612 for detecting and amplifying information on the columns selected by the Y gate circuit 610.

In general, a word is formed by a plurality of bits, and the Y decoder 608 generates signals for simultaneously selecting a plurality of columns of the memory cell array 600. Thus, a prescribed number of information bits are read from the information bit region 602, while an error checking bit associated with the information bits is read from the region 604. If a word line corresponds to a word, the Y decoder 608 may be omitted.

The mask ROM further includes an ECC circuit 614 for checking errors with respect to the data (the information bits and the error checking bit) detected and amplified by the sense amplifier circuit 612 and correcting as-checked errors, and an output buffer 616 for outputting correct information bits received from the ECC circuit 614 to the exterior. Referring to FIG. 14, information bits D0 to Dp are shown to be outputted in parallel to form a word of (p+1) bits, for example.

The ECC circuit 614 checks and corrects an error in the information bits on the basis of the information bits and the error checking bit received from the sense amplifier circuit 612, and transmits the corrected information bits to the output buffer 616. The error checking bit may be formed by a linear code employing a parity bit. In such a linear code, an error checking bit is generated from the information bits in accordance with a parity check equation. Such a linear code includes a well-known Hamming code, which can correct a single error. A general ECC circuit which is employed in a semiconductor memory device is provided with a one bit error checking and correcting function, or a two bit error checking and one bit error correcting function. In order to check and correct errors, a syndrome is generally generated from as-read information bits and error checking bit.

The mask ROM further includes a control circuit 618 which receives control signals (chip enable and output enable signals) /CE and /OE for controlling activation timings of the sense amplifier circuit 612 and the output buffer 616. In this mask ROM, the X decoder 606 and the Y decoder 608 statically operate to decode the supplied address signal bits RA0 to RAn and CA0 to CAm respectively. The control circuit 618 activates the sense amplifier circuit 612 in response to the chip enable signal /CE, and activates the output buffer 618 in response to the output enable signal /OE.

When the storage capacity of such a mask ROM is increased, NAND type memory cells are generally used, in order to improve integration and density of the memory cell array.

FIG. 15 illustrates configurations of NAND type memory cells. Referring to FIG. 15, a prescribed number of bits of memory cells AMC1 to AMCn are connected in series between a bit line BL2 and a source line SL, while a prescribed number of memory cells BMC1 to BMCn are connected in series between a bit line BL1 and the source line SL. The source line SL is connected to the ground potential GND. The bit lines BL1 and BL2 are connected to the Y gate circuit 610 shown in FIG. 14, while only one of the bit lines BL1 and BL2 is connected to the sense amplifier circuit 612 through the Y gate circuit 610. In the structure shown in FIG. 15, further, only one of the memory cell units may be connected to the source line SL depending on whether the selected bit line BL is denoted by an even or odd number, to form a current path between the selected bit line BL and the source line SL.

FIGS. 16A and 16B illustrate a plane arrangement and a sectional structure of a memory cell unit, i.e., a set of NAND-connected memory cells. Referring to FIG. 16A, an impurity diffusion region 300 is provided, and interconnection layers 1-1 to 1-n forming control gates of memory cell transistors, i.e., word lines, are arranged at prescribed intervals in a direction perpendicular to the impurity diffusion layer 300. Channel regions are formed in intersections between the diffusion layer 300 and respective ones of the interconnection layers 1-1 to 1-n. The diffusion layer 300 is formed zigzag, and an end (source region 2) is connected to an interconnection layer 5 forming a source line through a source contact 20 and another end (drain region 3) is connected to an interconnection layer 4 forming a bit line through a drain contact 30. The interconnection layers 5 and 4 forming the source and bit line are arranged in parallel to each other.

In the arrangement shown in FIG. 16A, two memory cell units (NAND-connected memory cells) are connected to one bit line 4. In this case, a selection transistor may be arranged between the bit line 4 and the source line 5 for forming a current path, in order to select one of the memory cell units. Similarly, two memory cell units are connected to one source line interconnection layer 5.

As shown in FIG. 16B, the drain region 3 is connected to the bit line interconnection layer 4 through the contact 30, and impurity layers 25-1 to 25-n are arranged between the drain region 3 and the source region 2 at prescribed intervals. Respective intervals between the drain region 3 and the impurity regions 25-1 to 25-n and the source region 2 are determined by the interconnection layers 1-1 to 1-n which are formed thereon. As clearly understood from FIG. 16B showing a section taken along the line A—A in FIG. 16A, a plurality of memory cells are connected to the interconnection layer 4 forming a bit line through one contact 30. The number of the bit line contact per memory cell is reduced and no grounding wire may be provided for each memory cell, whereby the area of the memory cell array can be reduced. The operation of the memory cells shown in FIGS. 15, 16A and 16B is now described.

In order to select a memory cell AMCj (j=1 to n) in FIG. 15, a word line wlj is set at a low potential level and remaining word lines wl1 to wl(j −1) and wl(j+1) to wln are set at high potential levels. A memory cell storing information "1" has a depletion type threshold voltage Vth of not more than 0 V, while that storing information "0" has an enhancement type threshold voltage Vth exceeding 0 V and being not more than the high potential level. When the selected memory cell AMCj stores information "1", this memory cell is such a depletion type transistor that a drain current Ids flows even if the potential at its control gate is at a low level. When the selected memory cell AMCj stores information "0", on the other hand, this memory cell is in an OFF state since the potential of its control gate is at a low level (0 V), with no flowing of the drain current Ids.

The potentials of the nonselected word lines are at high levels, whereby the nonselected memory cells are in ON states to feed drain currents Ids regardless of information stored therein since the control gates thereof are at high potential levels. Thus, a current or no current flows on the bit line BL2 in response to the information stored in the selected memory cell AMCj. The sense amplifier circuit 612 detects flow/non-flow of the current on the bit line BL2 to determine whether the read information is "1" or "0", thereby generating corresponding data.

In order to select a memory cell BMCj, the bit line BL1 is similarly selected by the Y gate circuit 610 to be connected to the sense amplifier circuit 612. Read data is generated in response to flow/non-flow of a current on the bit line BL1 at this time.

When a word is formed by a plurality of bits, i.e., when a plurality of information bits are simultaneously read, the memory cell array 600 is divided into blocks in correspondence to respective bits. As shown in FIG. 17, the information bit storage region 602 and the error checking bit storage region 604 of the memory cell array 600 are divided into blocks B#0 to B#M and P#0 to P#N respectively in correspondence to respective bits.

The word lines are arranged in common to respective blocks. In reading, one word line WL is so selected that data bits Q0 to QM and P0 to PN are read from respective blocks B#0 to B#M and P#0 to P#N. The as-read data bits Q0 to QM and P0 to PN are supplied to the ECC circuit through the sense amplifier circuit 612, to be subjected to error checking and correction.

In general, an ECC circuit which is provided in a semiconductor memory device has a one bit error checking and correcting function. Namely, such an ECC circuit generates a syndrome from the received data Q0 to QM and P0 to PN, to check and correct an error in accordance with this syndrome.

When data of a 1-bit memory cell (denoted by symbol X in FIG. 18A) is erroneous among memory cells connected to one word line WL as shown in FIG. 18A, it is possible to correct the error.

When a plurality of data bits are erroneous among data of the memory cells which are connected to one word line WL as shown in FIG. 18B, however, it is impossible to check and correct the errors by the ECC circuit.

When a word line is made defective by particles or the like, there is a high probability that data read from memory cells which are connected to this word line are erroneous, since such defects localize if the particles are large-sized. When a defective word line is selected, there is a high probability that a plurality of errors are caused in the data Q0 to QM and P0 to PN which are simultaneously selected and read out, leading to incapability of error checking and correction. Thus, defective word lines can be repaired only in a low rate, and the yield of such semiconductor memory devices is deteriorated.

SUMMARY OF THE INVENTION

An object of the present invention is to provide a semiconductor memory device which can reduce the probability that a plurality of errors are caused in simultaneously read data.

Another object of the present invention is to provide a semiconductor memory device which can improve defective bit repairability.

In the semiconductor memory device according to the present invention, a plurality of word lines are simultaneously selected in a memory cell array and memory cells located on different columns are selected from each word line.

According to the present invention, selected are memory cells which are connected to different word lines, whereby only one memory cell is selected from one word line at the maximum and it is possible to extremely reduce the probability that a plurality of selected memory cells include a plurality of defective bits. Thus, it is possible to check and correct errors by an ECC circuit, thereby improving the semiconductor memory device in yield.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
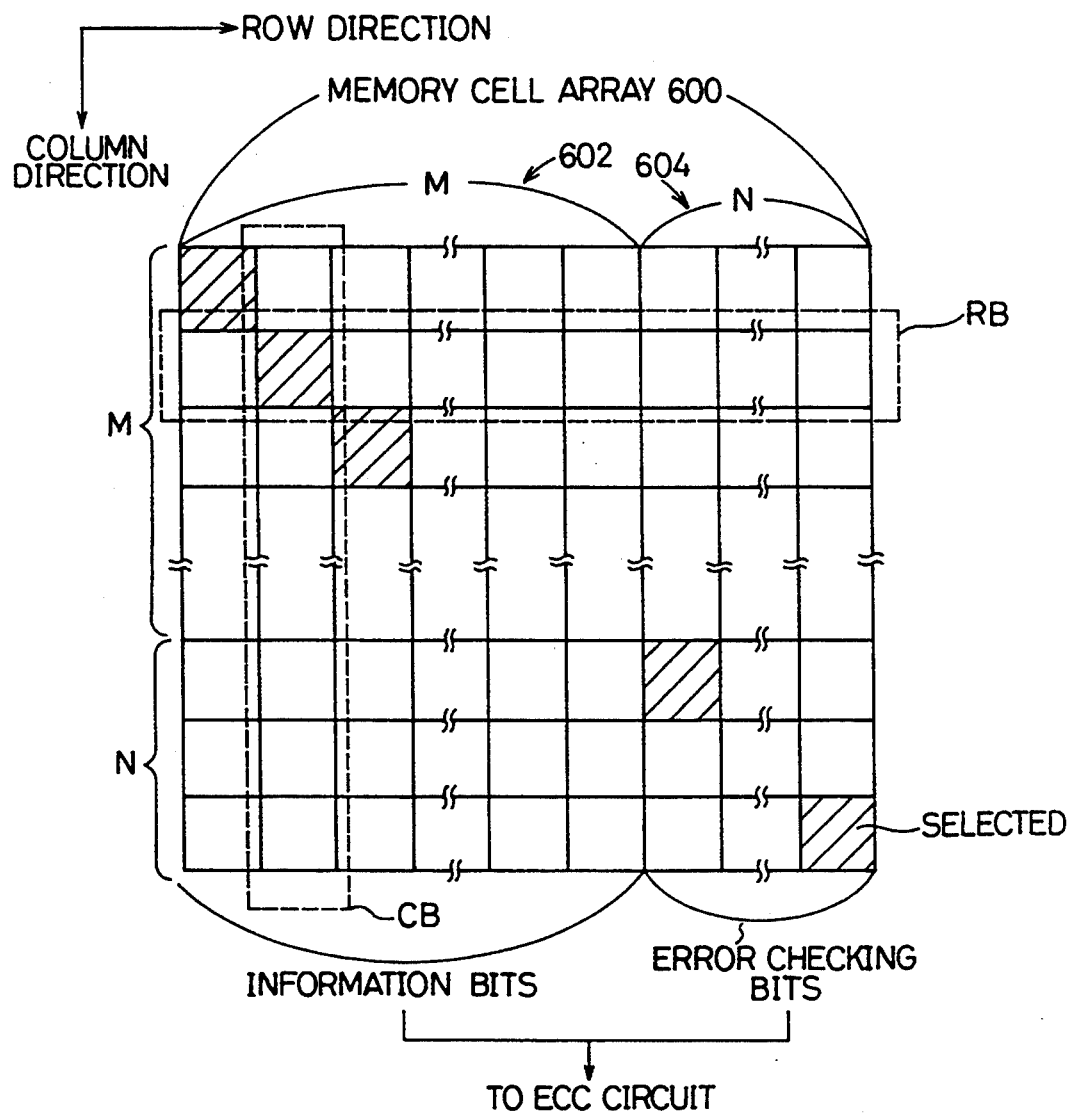
FIG. 1 illustrates a memory cell selection scheme according to the present invention in principle.

FIG. 1 illustrates a memory cell selecting operation in a semiconductor memory device according to the present invention. Referring to FIG. 1, a memory cell array 600 having a region 602 for storing information bits and a region 604 for storing error checking bits is divided into a plurality of subregions along row and column directions. In the following description, the "row direction" is defined as the direction of extension of rows, i.e., word lines, in the memory cell array 600, and the "column direction" is defined as the direction of extension of columns, i.e., bit lines, in the memory cell array 600.

The information bit storage region 602 is divided into M subregions in the row direction in correspondence to M information bits. The error checking bit storage region 604 is divided into N subregions along the row direction in correspondence to N error checking bits. The memory cell array 600 is further divided into M+N subregions along the column direction. In memory cell selection, a plurality of subregions which are located on different positions along the row and column directions are selected, and a 1-bit memory cell is selected in each of the selected subregions. The number of simultaneously selected subregions is equal to the sum of the numbers of the information bits and the error checking bits. Referring to FIG. 1, simultaneously selected subregions are illustrated with slant lines along a diagonal line of the memory cell array 600, as an example.

Word lines extend along the row direction in the memory cell array 600. For the convenience of illustration, sets of subregions are referred to as column blocks CB, and those of subregions aligned in the row direction are referred to as row blocks RB in the following description.

As shown in FIG. 1, one word line is selected in every row block RB. Further, one column, i.e., one bit line is selected in every column block CB. One subregion is selected in each row block RB and in each column block CB. The selected subregions are included in different row and column blocks.

The subregions are selected in the aforementioned mode, and a 1-bit memory cell is selected from each of the selected subregions. Since the word lines extend along the row direction of the memory cell array 600, only a 1-bit memory cell is accessed in relation to one word line. A defective word line merely leads to a high probability that data of a memory cell connected to the defective word line is erroneous. Thus, a probability that a plurality of bits are erroneous is extremely reduced and an ECC circuit reliably executes one bit error checking and correction when data of simultaneously selected memory cells are supplied to the ECC circuit as information bits and error checking bits. Namely, it is possible for the ECC circuit to reliably check and correct errors for reading correct data even if a word line includes a plurality of defective memory cells (or in a case in which the memory cells themselves are not defective but data read therefrom are erroneous). A specific structure is now described.

Figures 2, 3:
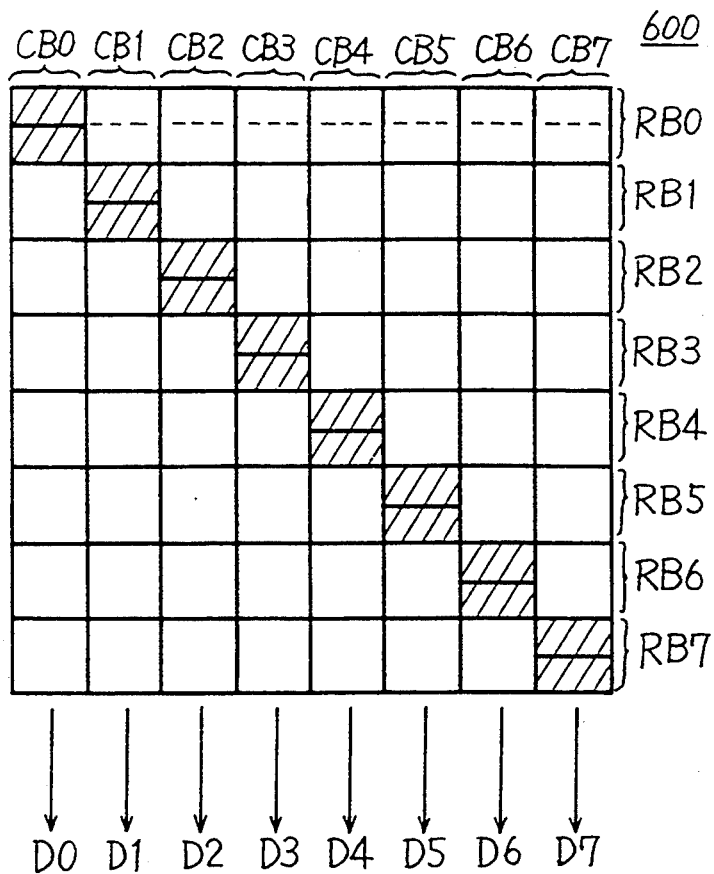
FIG. 2 illustrates a specific array structure according to the present invention.
FIG. 3 illustrates an arrangement of block addresses supplied to subregions selected in the array shown in FIG. 2.

Consider a case in which the memory cell array 600 is divided into 8 by 8 subregions along the row and column directions as shown in FIG. 2. In other words, assume now that the memory cell array 600 is divided into eight row blocks RB0 to RB7 and eight column blocks CB0 to CB7. 1-bit data D0 to D7 are outputted from the column blocks CB0 to CB7 respectively. The data bits D0 to D7 include information bits and error checking bits. The word lines are arranged along the row direction of the memory cell array 600. A state of selecting subregions located on different rows and columns equivalently corresponds to such a state that one word line is divided into eight regions and the divided regions are dispersed in subregions on different rows and columns, as shown in FIG. 2. The row blocks RB can be specified by employing high-order three bits of a row address, for example. Thus, the subregions may be selectively activated by the row address bits.

FIG. 3 illustrates exemplary distribution of block addresses in the memory cell array. Numerals shown in FIG. 3 represent block addresses (high-order three bits RA0 to RA2 of a row address) in decimal numbers. Among the block addresses shown in FIG. 3, the same address is arranged along a diagonal direction. Thus, it is possible to simultaneously select a plurality of subregions which are arranged on different row and column positions. In the structure shown in FIGS. 3 and 2, it is necessary to bring only selected subregions into active states (memory cell data readable states). A specific structure for selectively activating the subregions is now described.

Figure 4:
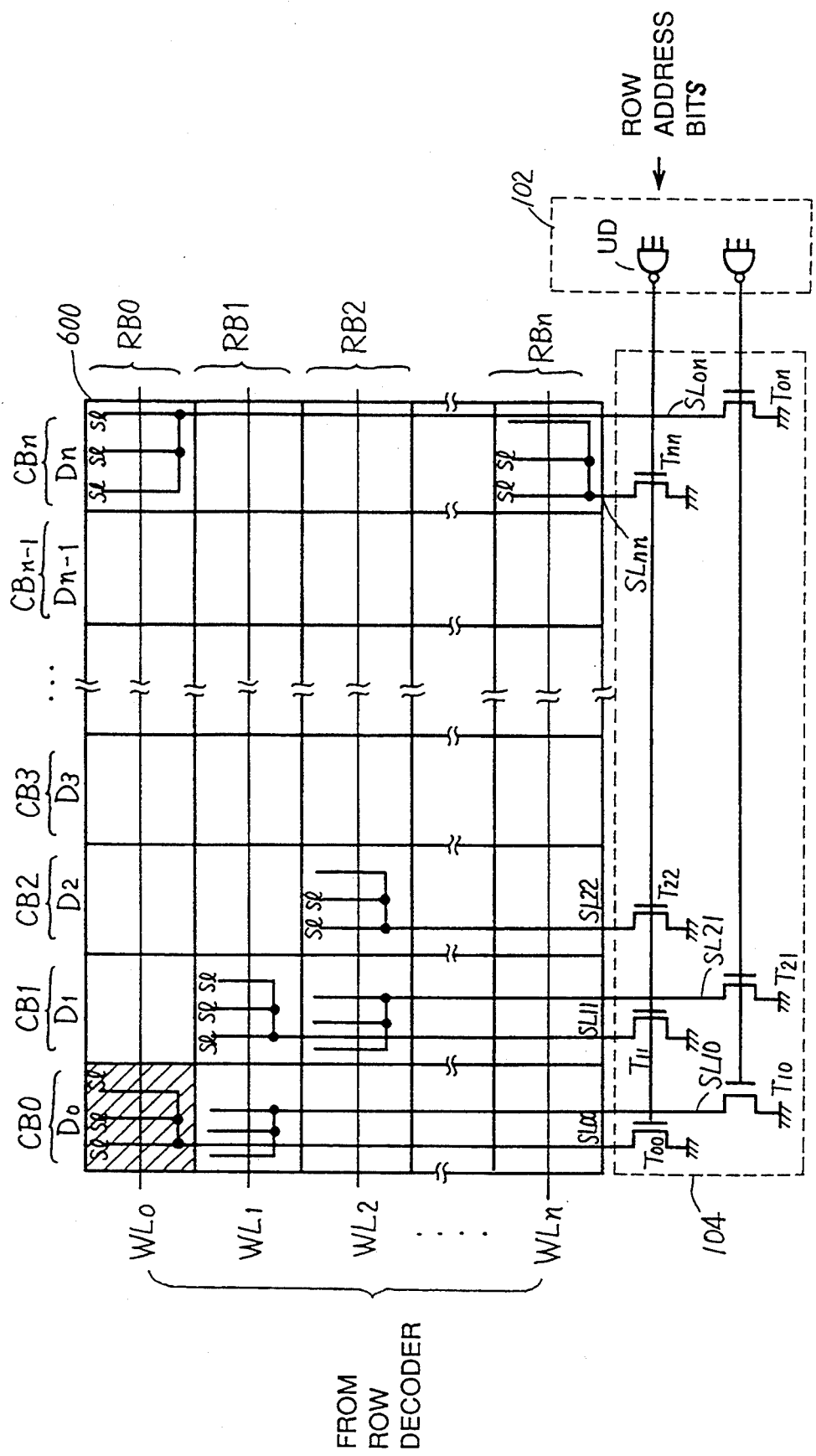
FIG. 4 illustrates the structure of a principal part of a semiconductor memory device according to an embodiment of the present invention.

FIG. 4 illustrates the structure of a principal part of a semiconductor memory device according to an embodiment of the present invention. Memory cells shown in FIG. 4 are nonvolatile memory cells, as an example. The nonvolatile memory cells have structures of forming current paths between sources and bit lines according to information stored therein. The memory cells may be any of EEPROM cells, PROM cells and ROM cells.

Referring to FIG. 4, (n+1) bits of data bits D0 to Dn are simultaneously read from a memory cell array 600. These data bits D0 to Dn include information bits and an error checking bit(s). The memory cell array 600 is divided into row blocks RB0 to RBn and column blocks CB0 to CBn of the same numbers as that of the simultaneously read data bits D0 to Dn. One word line is selected from each of the row blocks RB0 to RBn. Referring to FIG. 4, word lines WL0 to WLn are representatively shown in respective blocks.

All source lines sl included in each subregion are connected to a main source line SL. FIG. 4 representatively illustrates a main source line SL00 corresponding to a subregion located on a zeroth row and a zeroth column (the terms "row" and "column" are employed with respect to the subregions), a main source line SL11 corresponding to a subregion located on a first row and a first column, a main source line SL22 corresponding to a subregion located on a second row and a second column, a main source line SLnn corresponding to a subregion located on an n-th row and an n-th column, a main source line SL0n corresponding to a subregion located on the zeroth row and an n-th column, a main source line SL10 corresponding to a subregion located on the first row and the zeroth column, and a main source line SL21 corresponding to a subregion located on the second row and the first column. Namely, all source lines provided in a subregion located on an i-th row and a j-th column are connected to one main source line SLij.

The semiconductor memory device further includes a decoder circuit 102 which generates signals for selecting the subregions, and a main source line activation circuit 104 for bringing the main source lines of the subregions located on different rows and different columns into active states, i.e., to the ground potential level, in response to a region selection signal received from the decoder circuit 102. The main source line activation circuit 104 simultaneously activates the main source lines which are provided in correspondence to the simultaneously selected subregions. In other words, the main source lines are activated in a unit of the subregions to be simultaneously activated (selected). FIG. 4 representatively illustrates switching transistors T00, T11, T22, ..., Tnn which are provided in correspondence to the main source lines SL00, SL11, SL22, ..., SLnn for simultaneously entering conducting states and switching elements T10, T21, ..., T0n which are provided for the main sources lines SL10, SL21, ..., SL0n for simultaneously entering conducting states.

The decoder circuit 102 decodes high-order bits of a row address. Unit decoder circuits UD are provided for respective source line groups. A set of main source lines are activated when the row address bits are in a predetermined combination of logic states. The number of row address signal bits decoded by the decoder circuit 102 is decided by the number of the row blocks RB0 to RBn. If this number is eight, three high-order row address bits are employed. Assuming that K represents the number of the row blocks RB0 to RBn, the number k of the row address bits employed for selecting the subregions results from the following relational expression:

$$K=2^k$$

In this case, the word lines are selected through the remaining row address bits, and one word line is selected from each row block. At the same time, a group of the main source lines are selected by the decoder circuit 102. All main source lines are so grouped that subregions located on different rows and different columns are selected. In the nonvolatile semiconductor memory device, each read data is determined in response to whether or not a current flows across a bit line and a source line. If a main source line SL is in an electrically floating state, no current flows from a bit line into the source line. When one bit line is selected in each of the column blocks CB0 to CBn, therefore, it is possible to reliably read data held in a memory cell which is arranged in correspondence to an intersection of the bit line and a word line in a subregion determined by an activated main source line.

As hereinabove described, it is possible to read data held in memory cells which are arranged on different rows and different columns in a single read operation by simultaneously selecting a set of main source lines. Even if a word line includes a plurality of erroneous bits, therefore, it is possible to repair the erroneous bit by an ECC circuit. Thus, it is possible to remarkably improve defective bit repairability, thereby obtaining a highly reliable semiconductor memory device.

Figure 5:
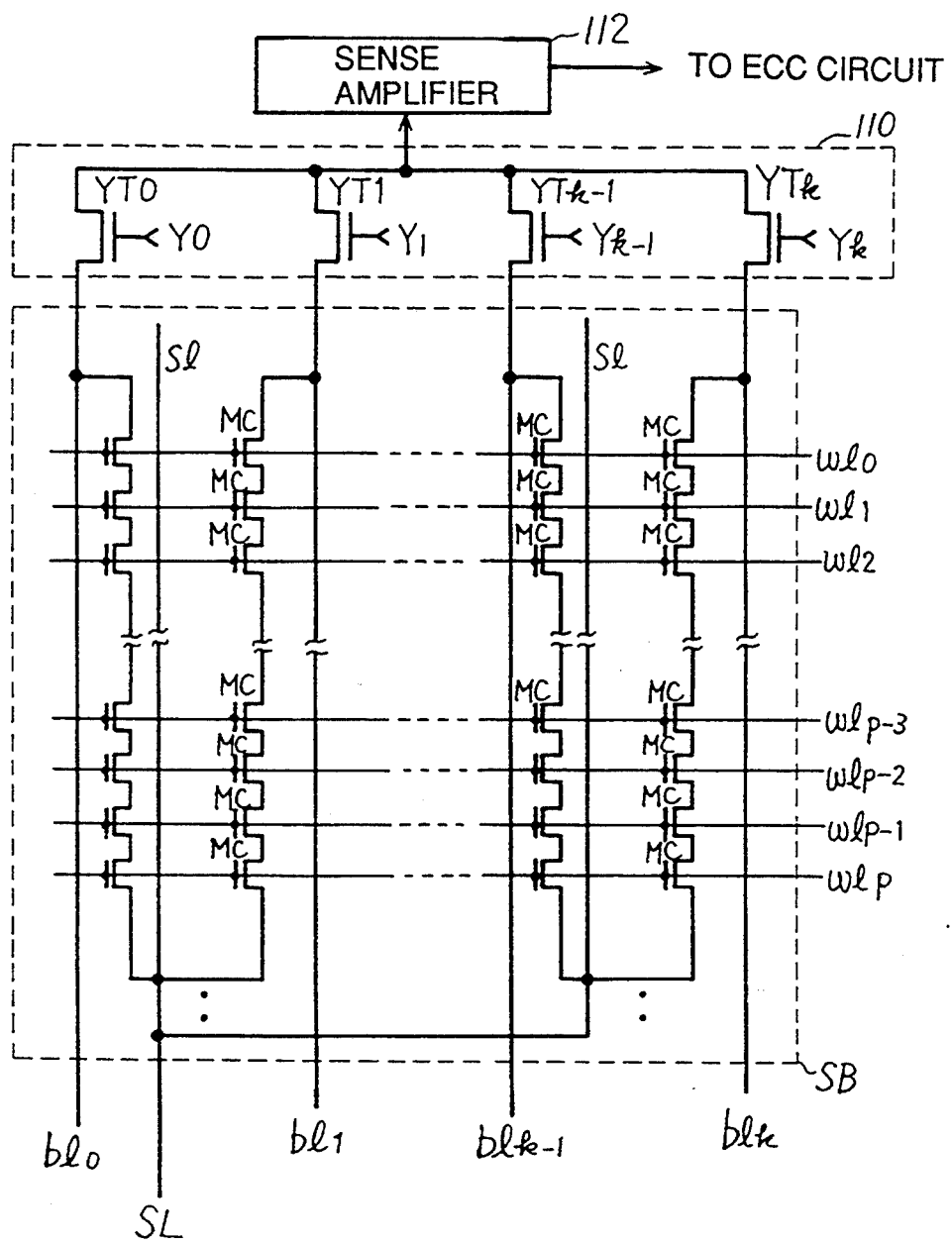
FIG. 5 illustrates the structure of a subregion in the semiconductor memory device shown in FIG. 4.

FIG. 5 illustrates a specific structure of one subregion SB in the memory cell array 600 shown in FIG. 4. Referring to FIG. 5, the subregion SB includes a plurality of word lines wl0 to wlp and a plurality of bit lines bl0 to blk. A plurality of memory cells MC are connected in series to each of the bit lines bl0 to blk. Other ends (source) of the serially connected memory cells MC is connected to a source line sl. One source line sl is provided for two bit lines bl. All the source lines sl are connected to the main source line SL.

The bit lines bl0 to blk are connected to Y gate transistors YT0 to YTk which are included in a Y gate circuit 110 respectively. Respective gates of the Y gate transistors YT0 to YTk are supplied with bit line selection signals (column selection signals) Y0 to Yk from the Y decoder. An output of the Y gate circuit 110 is connected to a sense amplifier 112, whose output is transmitted to an ECC circuit. The operation is now briefly described.

Assume that the main source line SL is in a nonselected (floating) state. In the NAND type memory cell structure, the potential of a selected word line is at a low level and that of a nonselected word line is at a high level. In the subregion SB shown in FIG. 5, one word line wl is selected, while the main source line SL is in a nonselected (floating) state. Even if one Y gate transistor YT is brought into a conducting state by a column selection signal in the Y gate circuit 110 to connect one bit line to the sense amplifier 112, no current flows into any source line from the bit line in this subregion SB. Thus, no currents on the bit lines bl0 to blk are influenced by data which are held in the memory cells MC provided in this subregion SB. Another subregion is selected in the same column block so that a current or no current flows through a bit line in response to data held in a 1-bit memory cell provided in the selected subregion. Thus, it is possible to reliably read data from the 1-bit memory cell provided in the selected subregion.

When the subregion SB shown in FIG. 5 is selected, the main source line SL is activated and connected to the ground potential GND. Thus, a current or no current flows through a bit line bl in response to data held in a memory cell which is arranged in correspondence to the intersection between a selected word line wl and the selected bit line bl. Thus, it is possible to read data held in the 1-bit memory cell from the selected subregion SB.

In the structure shown in FIG. 5, all memory cells arranged in a column are connected in series between a source line sl and a bit line bl in the subregion SB. The number of the memory cells which are connected in series between a source line and a bit line is appropriately selected. For example, a plurality of memory cell units, each of which is formed by a prescribed bit number of serially connected memory cells, may be separately provided along the column direction. Also in this case, all source lines sl are simply connected to a main source line SL. A structure for selecting a main source line and a word line is now described.

Figure 6:
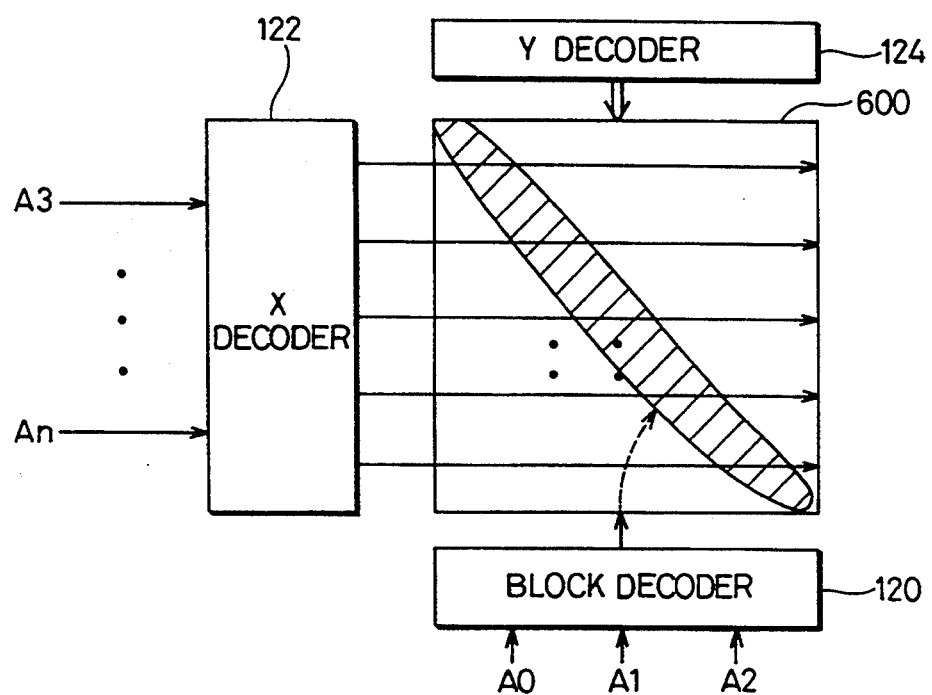
FIG. 6 illustrates a structure for selecting subregions in the semiconductor memory device shown in FIGS. 4 and 5.

FIG. 6 schematically illustrates a method of selecting subregions in the semiconductor memory device according to the embodiment of the present invention. A memory cell array 600 shown in FIG. 6 has eight row blocks, as an example. Referring to FIG. 6, an X decoder 122 receives address signal bits A3 to An, to select a word line from each row block of the memory cell array 600. A block decoder 120 receives high-order row address bits A0 to A2, to generate signals for selecting subregions. In correspondence to FIG. 4, the block decoder 120 includes the decoder circuit 102 and the main source line activation circuit 104. This block decoder 120 selects one set from eight sets of subregions, so that subregions along a diagonal direction of the memory cell array 600 are selected as shown by slant lines in FIG. 6, for example.

As to column selection, employed is a structure of selecting one bit line from one column block by the Y decoder 124 similarly to the prior art device, since the number of column blocks is equal to the sum of those of the information bits and the error checking bits. Thus, a structure similar to that of the prior art device can be applied to column selection.

In an ordinary NAND type memory cell structure, a prescribed number of bits such as eight bits or 16 bits are serially connected to form a unit. Such memory cell units can be applied to selection of subregions.

Figure 7A:
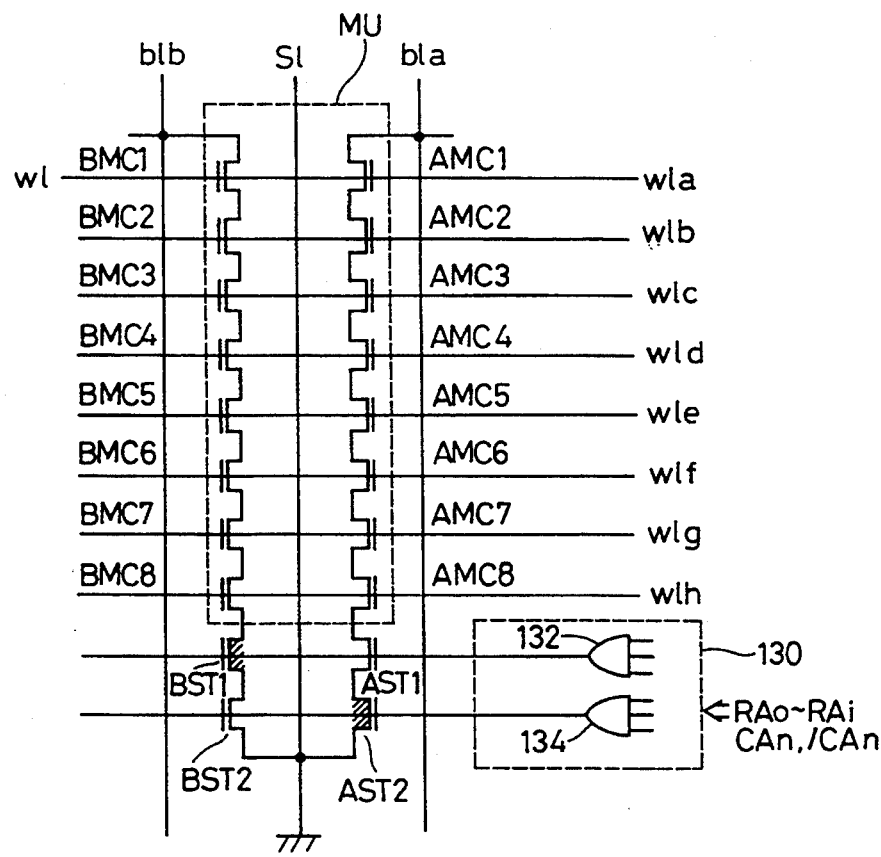
FIG. 7A illustrates the structure of a principal part of a semiconductor memory device according to another embodiment of the present invention.
Figure 8:
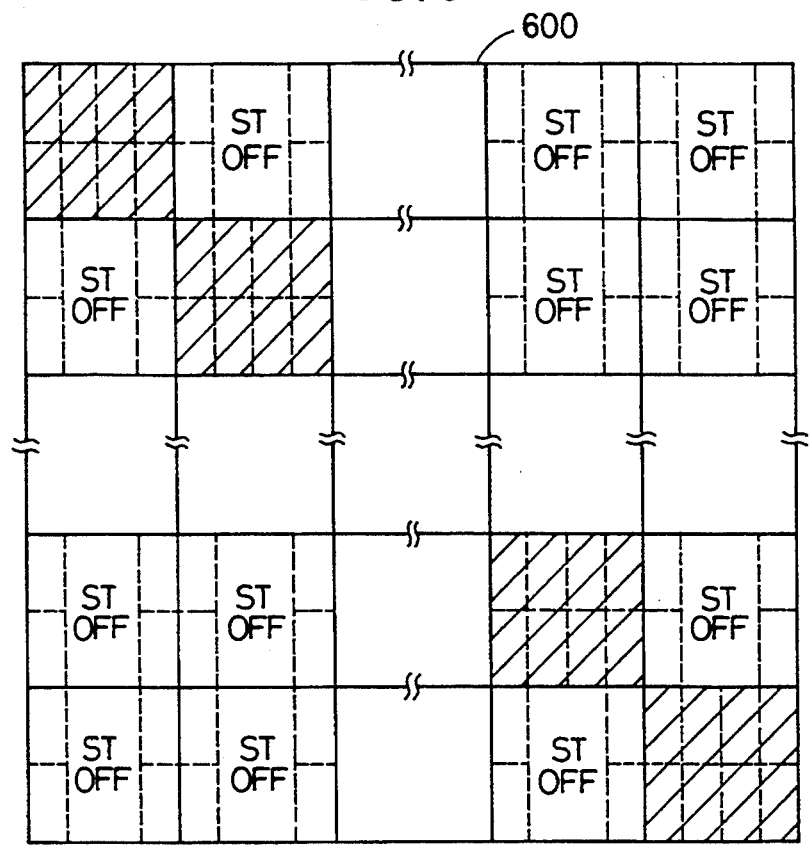
FIG. 8 illustrates distribution of ON/OFF states of selection transistors provided in a memory cell array in the semiconductor memory device shown in FIG. 7A.

FIG. 7A illustrates the structure of a principal part of a semiconductor memory device according to another embodiment of the present invention. Referring to FIG. 7A, 8-bit memory cells are connected in series to each bit line. More specifically, memory cells AMC1 to AMC8 are connected in series to a bit line bla, while memory cells BMC1 to BMC8 are connected in series to a bit line blb. One source line sl is provided for the 16-bit memory cells, which form one memory unit MU. The memory unit MU includes two memory cell units, each of which is formed by 8-bit serially connected memory cells. Selection transistors BST1, BST2, AST1 and AST2 are provided between sources of the memory cells BMC8 and AMC8 and the source line sl respectively. The selection transistors BST1 and BST2 are connected in series between the memory cell BMC8 and the source line sl, while the selection transistors AST1 and AST2 are connected in series between the memory cell AMC8 and the source line sl.

The selection transistors BST1 and AST2 are depletion type transistors, which are normally in ON states. The selection transistors AST1 and BST2 are enhancement type transistors, which enter conducting states when gate potentials thereof exceed prescribed levels. A decoder circuit 130 is provided in order to selectively bring the selection transistors AST1, AST2, BST1 and BST2 into ON states. The decoder circuit 130 is provided for each memory cell unit. The decoder circuit 130 decodes both of a subregion selection signal and a bit line selection signal. As to the bit line selection signal, the least significant column address bit is employed for specifying whether the selected bit line has an even or odd number allotted.

The decoder circuit 130 includes two unit decoder circuits 132 and 134 which are provided for the memory unit MU. The unit decoder circuit 132 controls the on/off state of the selection transistor AST1, while the unit decoder circuit 134 controls the on/off state of the selection transistor BST2. The unit decoder circuits 132 and 134 are supplied with identical subregion specifying signals RA0 to RAi and different column address bits (complementary column address bits CAn and /CAn). When this subregion is selected, one of the selection transistors AST1 and BST2 enters an ON state. When the subregion is not selected, the selection transistors AST1 and BST2 are brought into OFF states regardless of the column address bits.

When the memory unit MU is provided in a selected subregion, the unit decoder circuits 132 and 134 bring one of the selection transistors AST1 and BST2 into an ON state in response to the column address bits CAn and /CAn. When the memory unit MU is provided in a nonselected subregion, both selection transistors AST1 and BST2 are brought into OFF states. When the selection transistor AST1 is in an ON state, the memory cells AMC1 to AMC8 are connected in series between the bit line blb and the source line sl, to form a current path between the bit line blb and the source line sl. When the selection transistor AST1 is in an OFF state, the memory cells AMC1 to AMC8 are brought into electrically floating states. This also applies to the selection transistor BST2.

According to this structure, it is possible to bring all selection transistors provided in a nonselected subregion into OFF states while selecting a bit line in a selected subregion for reading data held in a selected memory cell.

As shown in FIG. 8, selection transistors ST (AST1 and BST2) are brought into OFF states in nonselected subregions (selected subregions are shown by slant lines in FIG. 8). This operation is executed for all memory units provided in the subregions. Thus, it is possible to read data held in memory cells which are arranged on different rows and different columns in the memory cell array 600, similarly to the aforementioned first embodiment.

In the structure shown in FIG. 7A, the selection transistors are serially connected to a generally employed unit of 8-bit or 16-bit memory cells. When two series-connected bodies (two memory cell units) of serially connected memory cells is connected to one bit line, selection transistors are provided between the bit line and the series-connected body. In this case, the selection transistors are supplied with the least significant bit of a column address. According to the structure shown in FIG. 7A, therefore, it is possible to simultaneously select memory cells which are arranged on different rows and different columns without increasing the number of transistors in the memory cell unit in the NAND type memory cell structure having such selection transistors. In this case, further, the length of the source line sl is so reduced that its parasitic capacitance can be reduced, whereby data can be reliably read at a high speed.

Figure 9:
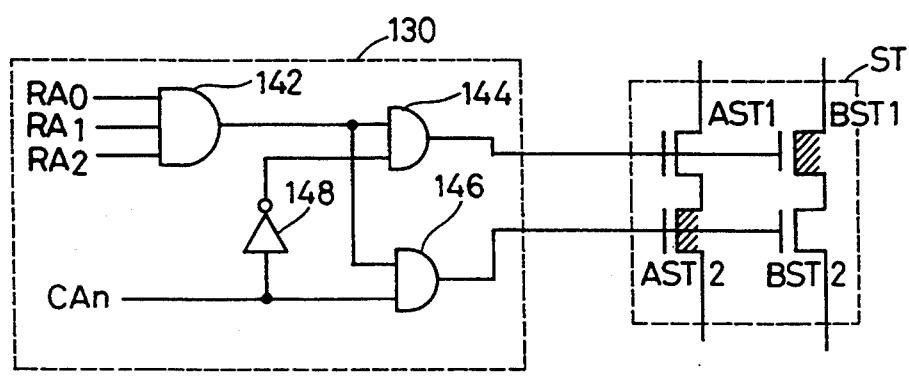
FIG. 9 illustrates the structure of a decoder circuit shown in FIG. 7A.

FIG. 9 illustrates a specific structure of the decoder circuit 130 shown in FIG. 7A. In relation to the decoder circuit 130 shown in FIG. 9, eight subregions are selected from those arranged in eight rows and eight columns. Referring to FIG. 9, the decoder circuit 130 includes an AND circuit 142 which receives the 3-bit high-order row address bits RA0 to RA2, an inverter circuit 148 which receives the least significant column address bit CAn, an AND circuits 144 which receives outputs of the inverter circuit 148 and the AND circuit 142, and an AND circuit 146 which receives the output of the AND circuit 142 and the least significant column address bit CAn. An output of the AND circuit 144 is supplied to gates of the selection transistors AST1 and BST1. An output of the AND circuit 146 is supplied to gates of the selection transistors BST2 and AST2.

The AND circuit 142 is an AND type decoder circuit, which receives a prescribed combination of the row address bits RA0 to RA2 (more precisely, RA0 and /RA0, RA1 and /RA1, RA2 and /RA2). When this subregion is selected, the output of the AND circuit 142 goes high so that the AND circuits 144 and 146 are enabled. If the least significant column address bit CAn is "high", the output of the AND circuit 146 goes high. If the least significant column address bit CAn is "low", the output of the AND circuit 144 goes high. Thus, it is possible to render conductive one of the selection transistors AST1 and BST2 in response to the least significant column address bit CAn in the selected subregion.

When this subregion is not selected, the output of the AND circuit 142 goes high and both outputs of the AND circuits 144 and 146 go low. In this case, all memory units are brought into electrically floating states in nonselected subregions, so that no data are read out. A structure for specifying subregions with the address bits RA0 to RA2 is identical to that in the first embodiment.

It is possible to simultaneously select a plurality of memory cells which are provided on different rows and different columns through a memory cell structure similar to that of the prior art device to read information by employing the aforementioned decoder circuit.

In the structure shown in FIG. 9, selection transistors for all memory units provided in a subregion are turned on/off. In this case, it is also possible to further divide each row block into memory cell units in the column direction, to turn on and off the selection transistors in a unit of the memory cell unit arranged in the row direction. In this case, row address bits are further added to the AND circuit 142 shown in FIG. 9. Namely, the memory cell units have activation and deactivation controlled in accordance with the position of word lines in a row block. An effect similar to the above can be attained also in this case.

Figure 7B:
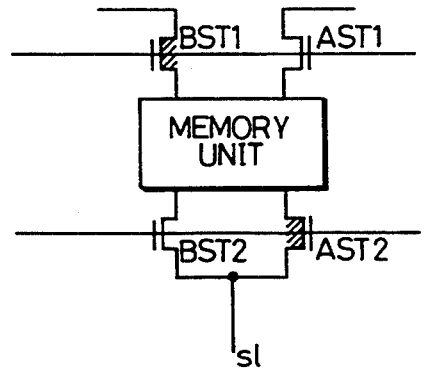
FIGS. 7B and 7C illustrate alternative structures.
Figure 7C:
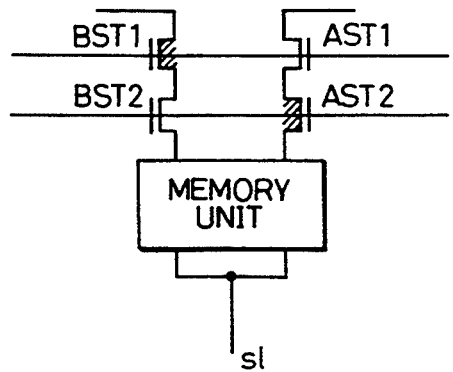

In the arrangement of the memory cells shown in FIG. 7A, the selection transistors AST1, AST2, BST1 and BST2 are arranged between the memory unit MU and the source line sl. Such selection transistors may alternatively be arranged between a memory unit MU and bit lines bla and blb, as shown in FIG. 7C. Alternatively, selection transistors AST1 and BST1 may be arranged between bit lines bla and blb and a memory unit and remaining selection transistors BST2 and AST2 are arranged between the memory unit and a source line sl, as shown in FIG. 7B.

Figure 10:
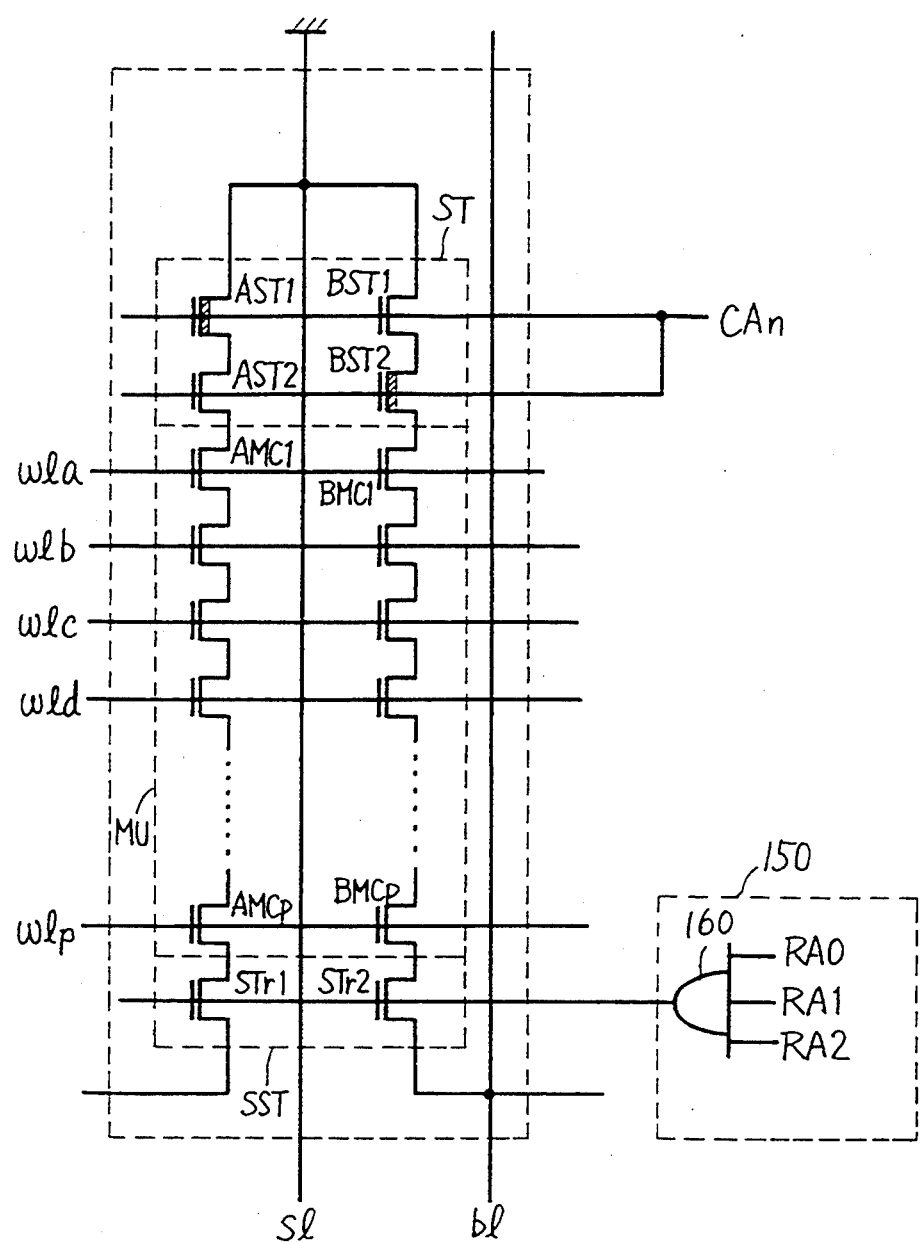
FIG. 10 illustrates the structure of a principal part of a semiconductor memory device according to still another embodiment of the present invention.
Figure 11:
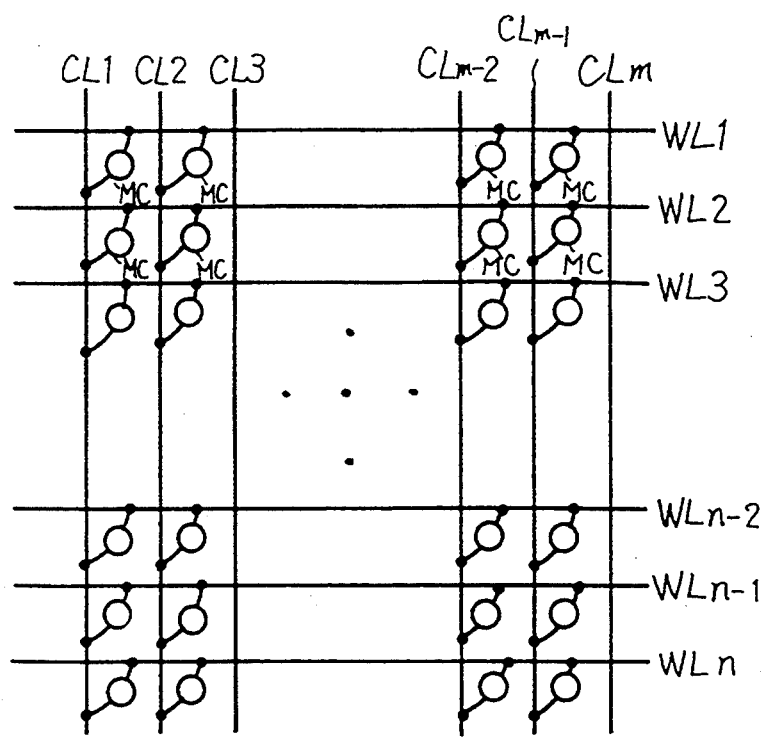
FIG. 11 illustrates the arrangement of a memory cell array in a conventional semiconductor memory device.
Figure 12A:
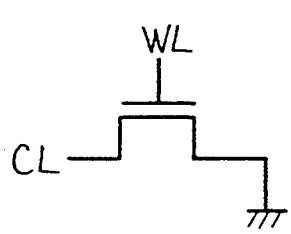
FIGS. 12A and 12B illustrate the structure of a read only memory cell.
Figure 12B:
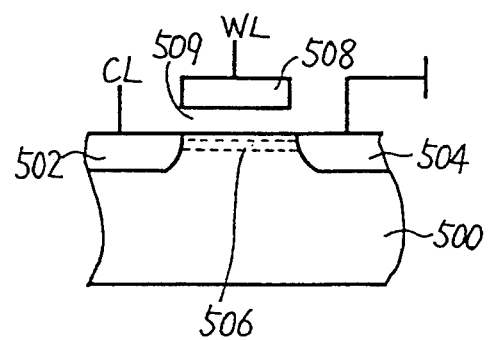
Figure 13:
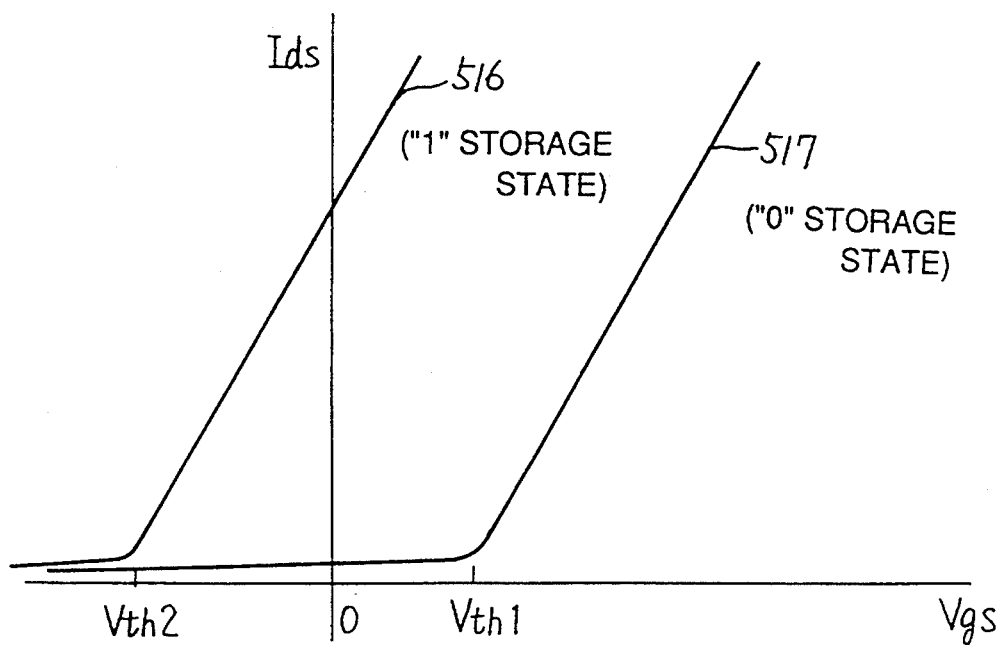
FIG. 13 shows the relation between information stored in a read only memory cell, a gate voltage and a drain current.
Figure 14:
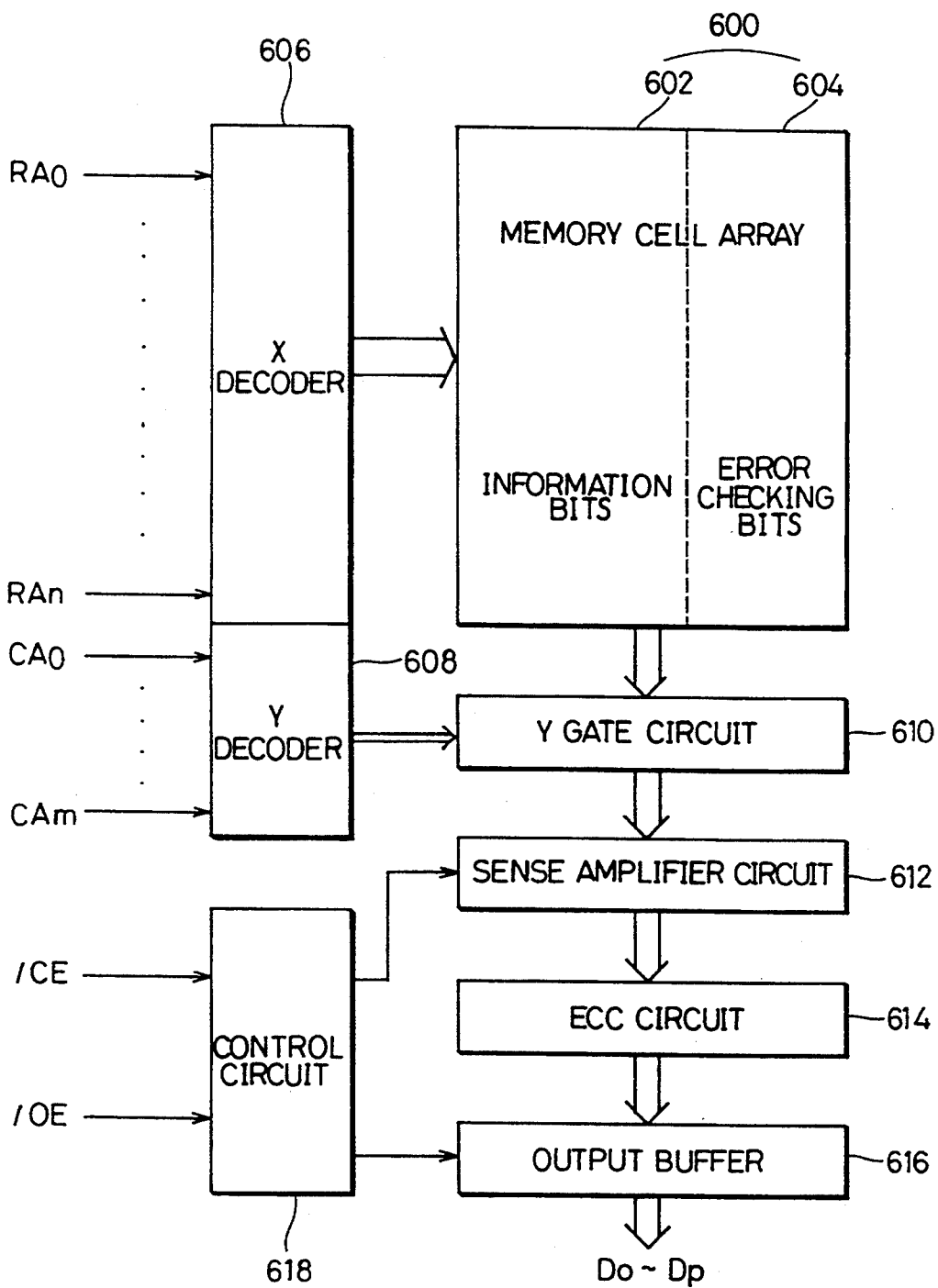
FIG. 14 schematically illustrates the overall structure of a conventional semiconductor memory device.
Figure 15:
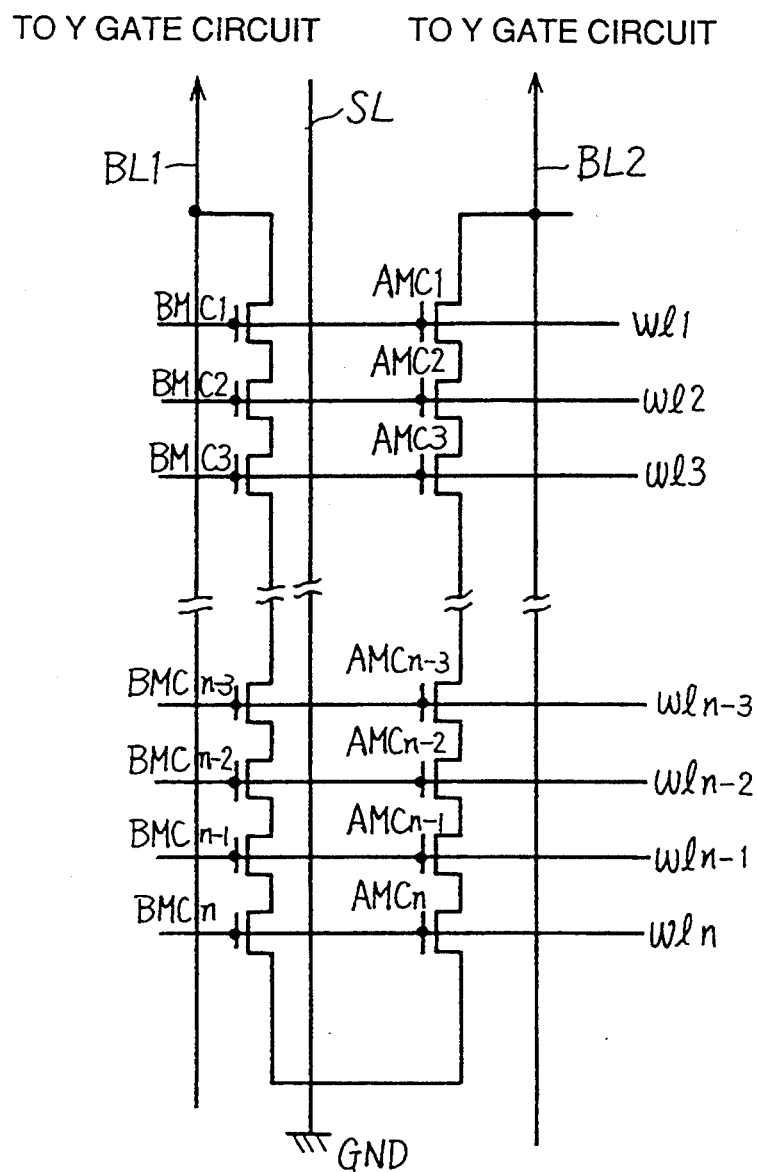
FIG. 15 illustrates the structure of a principal part of a memory cell array in the conventional semiconductor memory device.
Figure 16A:
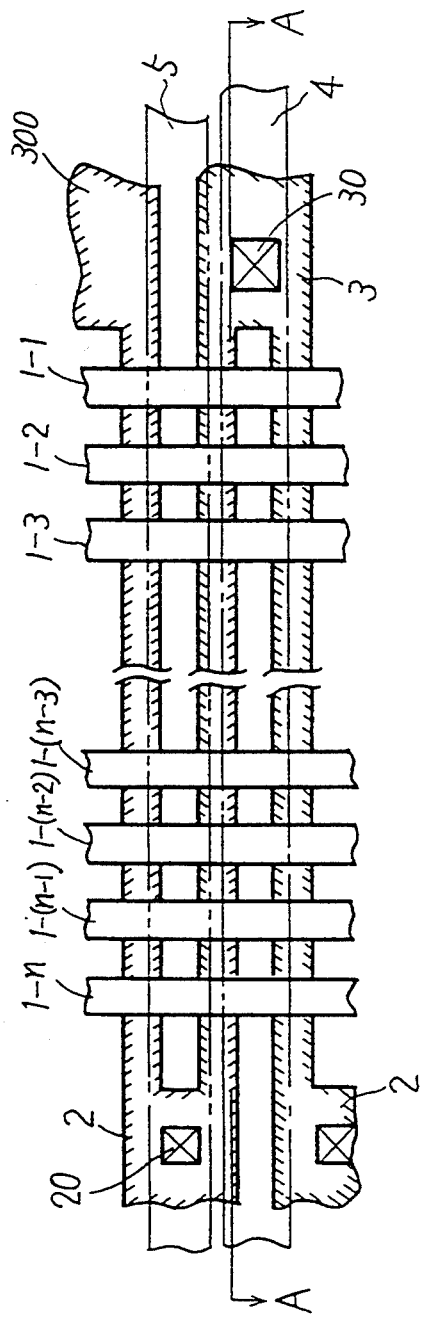
FIGS. 16A and 16B illustrate a plane arrangement and a sectional structure of the memory cell configuration shown in FIG. 15.
Figure 16B:
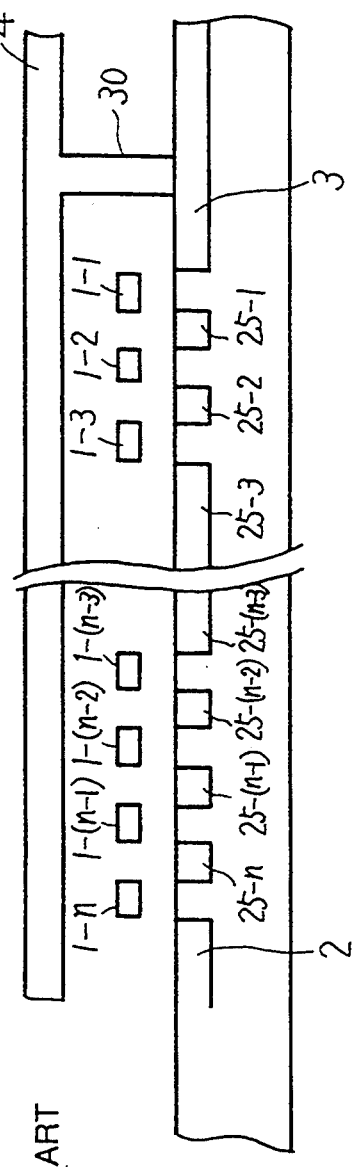
Figure 17:
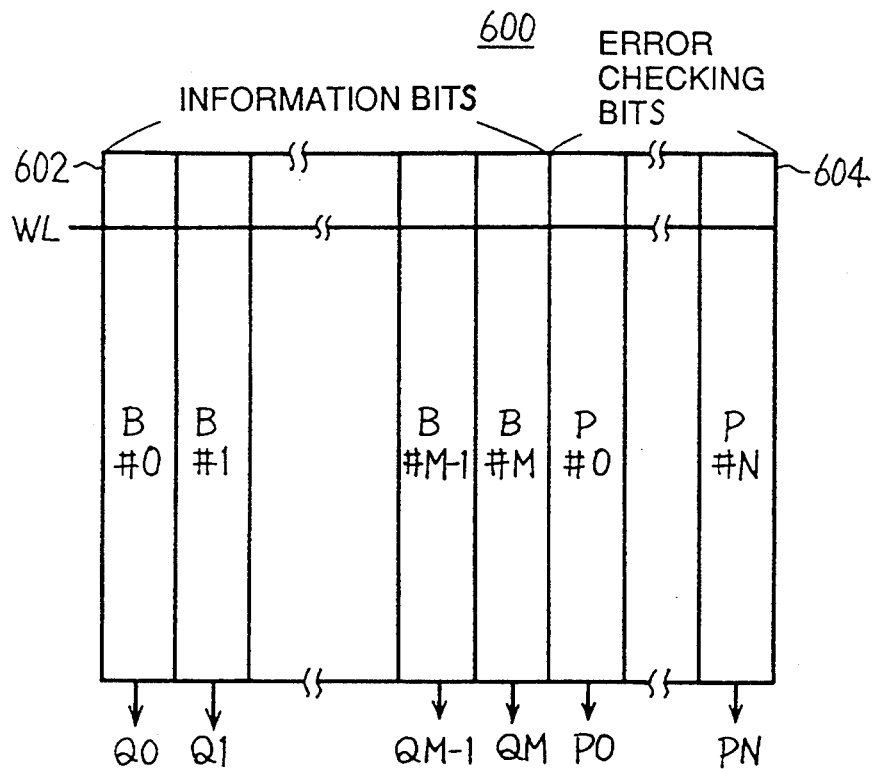
FIG. 17 illustrates correspondence between the memory cell array and stored data bits in the conventional semiconductor memory device.
Figure 18A:
FIGS. 18A and 18B are diagrams for illustrating problems in the conventional semiconductor memory device.
Figure 18B:
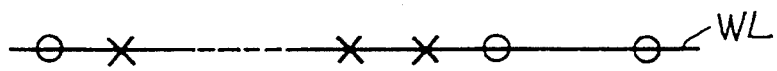

FIG. 10 illustrates the structure of a principal part of a semiconductor memory device according to still another embodiment of the present invention. Referring to FIG. 10, a selection gate ST is provided between a memory unit MU and a source line sl, while a region selection gate SST is provided between the memory unit MU and a bit line bl. The selection gate ST, which receives a least significant column address bit CAn, includes selection transistors AST1, BST1, AST2 and BST2. The selection transistors BST1 and BST2 are connected to the source line sl and in series with memory cells BMC1 to BMCp. The selection transistors AST1 and AST2 are connected to the source line sl and in series with memory cells AMC1 to AMCp. The region selection gate SST includes a selection transistor STr1 which connects the memory cells AMCp to AMC1 to a bit line (not shown) in response to a region selection signal, and a selection transistor STr2 which connects the memory cells BMCp to BMC1 to the bit line bl in response to the same region selection signal.

In the structure shown in FIG. 10, the selection transistors AST1 and BST2 are depletion type transistors, which are normally in ON states. The selection transistor BST1 or AST2 enters an ON state depending on whether a selected bit line has an even or odd number allotted (whether the least significant column address bit CAn is "1" or "0").

The selection transistors STr1 and STr2 receive the region selection signal, which is supplied from a decoder circuit 150, at gates thereof. When the memory unit MU is included in a nonselected subregion, the selection transistors STr1 and STr2 enter OFF states. When the memory unit MU is included in a selected subregion, the selection transistors STr1 and STr2 enter ON states. Also in this case, therefore, it is possible to serially connect a series body (memory unit) of memory cells between the bit line bl and the source line sl only in a selected subregion, thereby reading data from a column, i.e., a 1-bit memory cell in the selected subregion.

The decoder circuit 150 includes an AND circuit 160 which receives 3-bit row address signals RA0, RA1 and RA2. The AND circuit 160 is an AND type decoder circuit, which outputs a high- or low-level signal according to the combination of the logics of the received row address signal bits RA0, RA1 and RA2. More specifically, the input of the AND circuit 160 are selectively set to a false input (low-level active input) or a true input (high-level active input) according to the address of the subregion assigned thereto.

Also in the structure shown in FIG. 10, it is possible to simultaneously select memory cells which are arranged on different rows and different columns for reading data held therein, similarly to the structure shown in FIGS. 7A and 8. Thus reduced is a probability that a plurality of erroneous data bits are read out in a single read operation.

Also in this structure, additional row address bits may be supplied to the decoder circuit 150 in order to further divide the subregion into blocks each including a memory cell unit in the column direction.

In the above description, a mask ROM is illustrated as a nonvolatile semiconductor memory device and each memory cell has a NAND type structure. The mask ROM may alternatively have a NOR circuit type memory cell arrangement, in which a 1-bit memory cell is arranged on an intersection between each word line and each bit line.

The semiconductor memory device of the invention is not restricted to the mask ROM, but the present invention is also applicable to another type of memory device having bit lines, source lines and word lines such as an EEPROM or PROM, to attain the effect similar to the above.

A device such as a random access memory may be employed as a memory device capable of simultaneously selecting a plurality of bits of memory cells which are arranged on different rows and different columns. In a dynamic random access memory, for example, it is possible to simultaneously select a plurality of memory cells which are arranged on different rows and different columns by dividing a word line into a main word line which is common to a row block and subword lines which are divided into column blocks and connecting the main word line and the subword lines only in subregions which are arranged on different rows and different columns, as shown in FIG. 1.

In the above description, further, the memory cell array is divided into the same number of blocks along the row and column directions. Alternatively, the memory cell array may be divided into more regions along the column direction as compared with those in the row direction. For example, 2(M+N) row blocks RB may be provided in the structure shown in FIG. 1. The upper or lower half regions may be driven in response to selected word lines.

The number of memory cells which are simultaneously selected for data reading may be equal to the sum of those of the information bits and the error checking bit(s). The number of the error checking bits may be one or plural.

According to the present invention, as hereinabove described, data are simultaneously read from a plurality of memory cells which are arranged on different rows and different columns in a memory cell array, whereby there is no possibility that a plurality of erroneous bits are included in the data simultaneously read from the memory cells. Thus, it is possible to check and correct errors by an ECC circuit, thereby obtaining a highly reliable semiconductor memory device with a high yield.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device comprising:
   a memory cell array including a plurality of memory cells arranged in rows and columns;
   selection means responsive to an address signal for simultaneously selecting a predetermined constant number of memory cells in said memory cell array, each of the simultaneously selected memory cells being arranged both on a different row and on a different column with respect to other selected memory cells in said memory cell array for any address designated by said address signal; and
   reading means for reading out data of all of the simultaneously selected memory cells.

2. A semiconductor memory device according to claim 1, wherein said selection means includes:
   row selection means responsive to a row address for simultaneously selecting a plurality of rows in said memory array; and
   cell selection means responsive to block and column addresses for simultaneously selecting memory cells on respective selected rows and on different columns.

3. A semiconductor memory device according to claim 1, wherein said memory cell array includes a plurality of subregions arranged in row and column directions, each said subregion including a plurality of memory cells arranged in rows and columns, and
   wherein said selection means includes:
   means responsive to an address for activating a predetermined number of subregions among said subregions to bring the memory cells in the selected subregions into a selected state, said selected predetermined number of subregions being arranged on different rows and different columns with each other, and
   cell selection means responsive to a column address for selecting a plurality of memory cells, one from each of the selected predetermined number of subregions for data reading.

4. A semiconductor memory device according to claim 1, wherein said memory cell array provides the storage for information bits and at least one error checking and correction bit, and wherein the number of said simultaneously selected memory cells is equal to the sum of the numbers of the information bits and said at least one error checking and correcting bit.

5. A semiconductor memory device according to claim 1, wherein said memory cell array is divided into a plurality of subregions in row and column directions, and
   wherein said memory cell comprises a memory transistor having one conduction terminal coupled to a bit line corresponding a column, another conduction terminal coupled to a source line, and a gate connected to a word line corresponding to a row and for nonvolatilely storing a data, and
   wherein said selection means including block selection means responsive to the address signal for selecting a plurality of subregions arranged on different rows and different columns in said memory cell array, and means responsive to said block selection means for forming a current flow path from a bit line through a memory cell on a selected row and a source line to a reference potential supply only in the selected subregions.

6. A semiconductor memory device comprising:
   a memory cell array including nonvolatile memory cells being arranged in a matrix of rows and columns, said memory cell array being divided into the same number of blocks along directions of said rows and said columns to have a plurality of subregions;
   a plurality of word lines being arranged in correspondence to said rows of said memory cell array, each said word line being connected with a row of said memory cells;
   a plurality of bit lines being arranged in correspondence to said columns of said memory cell array, each said bit line being coupled with a column of said memory cells;
   a plurality of sub source lines each being coupled with a prescribed number of cells of said memory cells;
   a plurality of main source lines being arranged in correspondence to respective said subregions, each said main source line being connected with sub source lines provided in a corresponding subregion in common;
   word line selection means for selecting a plurality of word lines included in different subregions in said column direction in response to a supplied address signal;
   source line selection means for simultaneously selecting a plurality of main source lines being provided in different subregions in said row and column directions from said plurality of subregions in response to the supplied address signal;
   bit line selection means for selecting a plurality of bit lines one from each of said subregion being divided in said row direction in response to the supplied address signal; and
   means for reading data from memory cells being arranged in correspondence to intersections of the selected word lines, the selected bit lines and the sub source lines being connected to the selected main source lines.

7. A semiconductor memory device according to claim 6, wherein a predetermined number of memory cells are connected in series between an associated bit line and an associated sub source line to constitute a memory unit, and wherein said source line selection means includes coupling means for coupling the main source line in each respective selected subregion to a reference potential supply and for bringing main source lines in non-selected subregions into an electrically floating state.

8. A semiconductor memory device according to claim 7, wherein said coupling means includes means for coupling all the sub source lines in the selected subregions to the reference potential supply.

9. A semiconductor memory device according to claim 7, wherein said coupling means includes means for coupling a sub source line for a memory unit crossing a selected word line to the reference potential supply through the main source lines.

10. A semiconductor memory device comprising:
   a memory cell array including a plurality of memory cells arranged in a matrix of rows and columns for storing information in a nonvolatile manner, a prescribed number of cells of said memory cells being serially arranged to form a unit, said memory cell array being divided into a plurality of regions along directions of said rows and said columns;
   a plurality of word lines arranged in correspondence to respective said rows;
   a plurality of bit lines arranged in correspondence to respective said columns;
   a plurality of source lines arranged in correspondence to said prescribed number of memory cells, each said unit having said prescribed number of memory cells serially connected between a corresponding source line and a corresponding bit line;
   word line selection means for simultaneously selecting a plurality of word lines contained in different ones of said regions divided along said column direction from said plurality of word lines in response to a supplied address;
   bit line selection means for selecting a bit line from respective ones of said regions divided along said row direction in response to the supplied address signal; and
   source line selection means for forming a current path between a corresponding bit line and a corresponding source line for each of said units of said memory cells in response to the supplied address, said source line selection means including means for forming said current paths for the units of said memory cells provided in different subregions from each other in both said row and column directions.

11. A semiconductor memory device in accordance with claim 10, wherein said source selection means includes:
   decoder means for selecting a plurality of subregions in response to a row address signal and a column address signal and generating signals for specifying memory cell units in the selected subregions, and
   means provided in correspondence to said memory cell units for connecting corresponding memory cell units to corresponding bit or source lines in response to outputs of said decoder means to form said current paths between said corresponding bit lines and said corresponding source lines.

12. A semiconductor memory device in accordance with claim 10, wherein said source line selection means includes:
   first decoder means for generating a bit line specifying signal for specifying a bit line in response to a supplied address signal,
   a first switching element for forming a current path between the specified bit line and an associated source line in a unit of a memory cell unit in response to an output of said first decoder means,
   second decoder means for generating a signal for specifying a subregion in response to a supplied address, and
   a second switching element for forming said current paths between bit lines and corresponding source lines with respect to all of memory cell units in the specified subregions in response to an output of said second decoder means,
   said first switching element, said second switching element and a memory cell unit being connected in series between a corresponding bit line and a corresponding source line.

13. A method of reading out data from a semiconductor memory device having a memory cell array including a plurality of memory cells arranged in rows and columns, comprising the steps of:
   selecting a plurality of rows in said memory cell array in response to a first address signal;
   selecting a plurality of memory cells on the selected rows and on different columns in response to a second address signal, one memory cell from each of the selected rows, each of the selected memory cells being arranged on a different column with respect to other selected memory cells for any address designated by said second address signal;
   reading data of the selected memory cells for error checking and correction; and
   supplying data externally after the error checking and correction.

14. A method according to claim 13, wherein said memory cell array includes a plurality of rows blocks, each sharing a row, and a plurality of column blocks, each sharing a column, and
   wherein said first mentioned step of selecting includes the steps of selecting a row in each respective row block, and activating a sub block in said each respective row block such that each activated sub block is contained in a different column block from other activated sub blocks.

15. A method according to claim 14, wherein the second mentioned step of selecting includes the step of selecting a column in each respective column block.

16. A method according to claim 14, wherein said memory cell comprises a nonvolatile memory cell transistor, and wherein said step of activating includes the step of establishing a current flow path through a memory cell transistor from an associated column to a reference potential supply in the activated subregions.

* * * * *